United States Patent
Kochanski

(10) Patent No.: US 9,551,561 B2
(45) Date of Patent: Jan. 24, 2017

(54) DETERMINING LOCATION USING MAGNETIC FIELDS FROM AC POWER LINES

(71) Applicant: Google Inc., Mountain View, CA (US)

(72) Inventor: Gregory Peter Kochanski, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 386 days.

(21) Appl. No.: 14/185,346

(22) Filed: Feb. 20, 2014

(65) Prior Publication Data
US 2015/0153151 A1    Jun. 4, 2015

Related U.S. Application Data

(60) Provisional application No. 61/911,828, filed on Dec. 4, 2013.

(51) Int. Cl.
*G01B 7/004*    (2006.01)
*G01B 7/14*    (2006.01)

(52) U.S. Cl.
CPC ..................... *G01B 7/004* (2013.01)

(58) Field of Classification Search
CPC ........... G01B 7/14; G01B 7/046; G01B 7/023; G01B 7/004; G01B 7/00; G05D 1/10; G05D 1/00
See application file for complete search history.

(56) References Cited

U.S. PATENT DOCUMENTS

| | | | |
|---|---|---|---|
| 4,710,708 A | 12/1987 | Rorden et al. | |
| 4,816,634 A | 3/1989 | Lentz et al. | |
| 5,576,973 A | 11/1996 | Haddy | |
| 6,249,246 B1 | 6/2001 | Bode et al. | |

(Continued)

FOREIGN PATENT DOCUMENTS

| | | |
|---|---|---|
| EP | 2 615 420 A2 | 7/2013 |
| EP | 2 662 700 A2 | 11/2013 |
| WO | WO 2011065931 | 6/2011 |

OTHER PUBLICATIONS

Electromagnetic Articulography—http://clas.mq.edu.au/physiology/ema/index.html—9 pages, Nov. 7, 2013.

(Continued)

*Primary Examiner* — Toan Le
(74) *Attorney, Agent, or Firm* — Dority & Manning, P.A.

(57) ABSTRACT

Systems and methods for determining location using magnetic fields from AC power lines are provided. As an example, each magnetic field reading collected by the device over time can be analyzed to determine a plurality of characteristics of the magnetic field. One or more of the plurality of characteristics can describe a component of the magnetic field that oscillates at a frequency associated with the AC power lines. The plurality of characteristics can be compared to expected values respectively associated with a plurality of locations and provided by a map of the magnetic field to determine a location at which each magnetic field reading was collected. In further embodiments, magnetic field readings collected by the device over time can be analyzed in conjunction with other data or constraints to determine a trajectory of the device. In addition, the map can be updated using the collected readings and the determined trajectory.

20 Claims, 5 Drawing Sheets

(56) References Cited

U.S. PATENT DOCUMENTS

| | | | |
|---|---|---|---|
| 6,686,881 | B1 | 2/2004 | Lu et al. |
| 7,395,966 | B2 | 7/2008 | Braiman |
| 7,463,907 | B2 | 12/2008 | Smith et al. |
| 8,359,344 | B2 | 1/2013 | Das et al. |
| 8,593,282 | B2 | 11/2013 | Scarola et al. |
| 8,600,341 | B2 | 12/2013 | Johnson |
| 8,781,739 | B1 | 7/2014 | Miller |
| 8,798,924 | B2 | 8/2014 | Haverinen |
| 8,855,671 | B1 | 10/2014 | Mirov |
| 2005/0153713 | A1 | 7/2005 | Sharony |
| 2008/0091345 | A1 | 4/2008 | Patel et al. |
| 2008/0300748 | A1 | 12/2008 | Drummy et al. |
| 2009/0196267 | A1 | 8/2009 | Walker |
| 2011/0300850 | A1 | 12/2011 | Kuo et al. |
| 2012/0016538 | A1* | 1/2012 | Waite ............... G01C 21/20 701/3 |
| 2012/0143495 | A1 | 6/2012 | Dantu |
| 2012/0232838 | A1 | 9/2012 | Kemppi et al. |
| 2012/0245885 | A1 | 9/2012 | Kimishima |
| 2013/0099927 | A1 | 4/2013 | Kulinets et al. |
| 2013/0179074 | A1 | 7/2013 | Haverinen |

OTHER PUBLICATIONS

Burgard et al., "Integrating Global Position Estimation and Position Tracking for Mobile Robots: The Dynamic Markov Localization Approach", IEEE/RSJ International Conference on Intelligent Robots and Systems, vol. 3, Victoria, Canada, Oct. 17, 1998—6 pages.

Cheng et al., "Towards a Magnetic Localization System for 3-D Tracking of Tongue Movements in Speech-Language Therapy", IEEE Engineering in Medicine and Biology Society, Minneapolis, Minnesota, Sep. 3-6, 2009, op. 563-566.

Dellaert et al., "Square Root SAM: Simultaneous Localization and Mapping via Square Root Information Smoothing", The International Journal of Robotics Research, vol. 25, No. 12, Dec. 2006, pp. 1181-1203.

Gozick et al., "Magnetic Maps for Indoor Navigation", IEEE Transactions on Instrumentation and Measurement, vol. 60, No. 12, Dec. 2011, 9 pages.

Grandi, "A Simple Method to Approximate the Magnetic Field in the Vicinity of Overhead Power Lines", 5th IASTED International Conference on Power and Energy Systems, Tampa, Florida, Nov. 19-22, 2001—6 pages.

Li et al., "Using Geomagnetic Field for Indoor Positioning", International Global Navigation Satellite Systems Society Symposium, Outrigger Gold Cost, Qld Australia, Jul. 16-18, 2013, 12 pages.

Mamishev et al., "Measurement of Magnetic Fields in the Direct Proximity of Power Line Conductors", IEEE Transactions on Power Delivery, vol. 10, Issue 3, Jul. 1995, pp. 1211-1216.

Moore et al., "Magnetic Localization for Perching UAVs on Powerlines", International Conference on Intelligent Robots and Systems, San Francisco, California, Sep. 25-30, 2011, 8 pages.

Moore et al., "Powerline Perching with a Fixed-Wing UAV", Proceedings of the AIAA Infotech Aerospace Conference, Seattle Washinoton, Apr. 7-9, 2009, 16 pages.

Morelli et al., "Hidden Markov Models for Radio Localization in Mixed LOS/NLOS Conditions", IEEE Transactions on Signal Processing, vol. 55, Issue 4, Apr. 2007, 1525-1542.

Subbu et al., "LocateMe: Magnetic Fields Based Indoor Localization Using Smartphones", ACM Transactions on Intelligent Systems and Technology, vol. 4, Issue 4, Sep. 2013, 27 pages.

The Viterbi Algorithm, Center for Intelligent Machines, cim.mcgill.ca, Dec. 3, 2013, 4 pages.

Juang, Biing-Hwang, "Hidden Martov Models", Encyclopedia of Telecommunications 2003, DOI: 10.1002/0471219282.eot114, John Wiley and Sons, Apr. 15, 2003, Abstract.

Rabiner et al., "An Introduction to Hidden Markov Models", IEEE ASSP Magazine, Jan. 1986, p. 4-16.

MIROV—U.S. Appl. No. 13/762,575, filed Feb. 8, 2013.

International Search Report for PCT/US2014/013135 dated Apr. 9, 2014, 4 pages.

Haverinen et al., "Global indoor self-localization based on the ambient magnetic field", Robotics and Autonomous Systems 57 (2009) 1028-1035.

Kim et al., "Indoor Positioning Systems Using Geomagnetic Anomalies for Smartphones", 2012 International Conferecne on Indoor Positioning and Indoor Navigation, New South Wales, Sydney, Australia, Nov. 13-15, 2012, 5 pages.

Vallivaara et al., "Magnetic field-based SLAM method for solving the localization problem in mobile robot floor-cleaning task", 15th International Conference on Advanced Robotics, Tallinn, Estonia, Jun. 20-23, 2011, 198-203.

Kemppi et al., "Use of artificial magnetic anomalies in indoor pedestrain naqvigation", Vehicular Technology Conference Fall, 2010 IEEE 72nd Ottawa, ON, CA, Sep. 6, 2010, 5 pages.

* cited by examiner

DETERMINING LOCATION USING MAGNETIC FIELDS FROM AC POWER LINES

PRIORITY CLAIM

The present application claims the benefit of priority to U.S. Provisional Application Ser. No. 61/911,828 filed on Dec. 4, 2013, which is incorporated herein by reference for all purposes.

FIELD

The present disclosure relates generally to determining a location of a device. More particularly, the present disclosure relates to systems and methods for using magnetic fields generated by alternating current power lines to determine the location of the device.

BACKGROUND

Many devices commonly include various positioning systems to determine a current or past location of the device. For example, a smartphone, vehicle, or other device can be equipped with a global positioning system (GPS), a positioning system that determines location relative to WiFi broadcast beacons, or other positioning systems to assist in determining a current location of the device at a particular time. Knowledge of the location of the device can assist in many endeavors, including navigation, data collection, self-driving vehicles, or any other task in which knowledge of the location of the device is beneficial.

However, typical positioning systems and sensors generally suffer from some degree of noise, malfunction, or other inherent limitations. As an example, GPS can fail to provide location determination when the device is located within a building. For example, the signals from the GPS satellites may fail to penetrate the building and be sufficiently received by the device, rendering the GPS positioning system unable to determine a precise location.

As buildings can typically have one or more WiFi transmitters, WiFi navigation can represent one potential solution to the failure of GPS to properly operate in an indoor environment. However, WiFi navigation typically depends on signal strength measurements and WiFi signals are reflected by metallic objects and absorbed by walls, people, and other objects. Therefore, since the WiFi signal strengths are not accurately predictable in practice, WiFi navigation generally is not capable of providing a precise measurement, particularly in the context of a crowded indoor environment.

As another example, existing car navigation systems may struggle to properly operate in severe weather. For example, optical sensors included in a self-driving car system may suffer from decreased efficacy when rain, snow, road salt, or other contaminants obscure the sensor. In addition, if the system relies upon matching of observed terrain to a pre-existing map, then the presence of deep snow drifts or other environmental changes will reduce the system functionality.

SUMMARY

Aspects and advantages of the present disclosure will be set forth in part in the following description, or may be obvious from the description, or may be learned through practice of embodiments of the present disclosure.

One example aspect of the present disclosure is directed to a method for determining location using magnetic field readings. The method includes obtaining, by one or more computing devices, a reading of a magnetic field collected by a magnetometer. The method includes determining, by the one or more computing devices, a plurality of characteristics of a magnetic field based at least in part on the reading. One or more of the plurality of characteristics describe a component of the magnetic field that exhibits a frequency at which electrical power is transmitted along one or more power lines. The method includes comparing, by the one or more computing devices, the plurality of characteristics to a plurality of expected values associated with each of a plurality of locations. The plurality of expected values for each location are provided by a map of the magnetic field.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling description of the present disclosure, directed to one of ordinary skill in the art, is set forth in the specification, which makes reference to the appended figures, in which.

DETAILED DESCRIPTION

Figure 1:
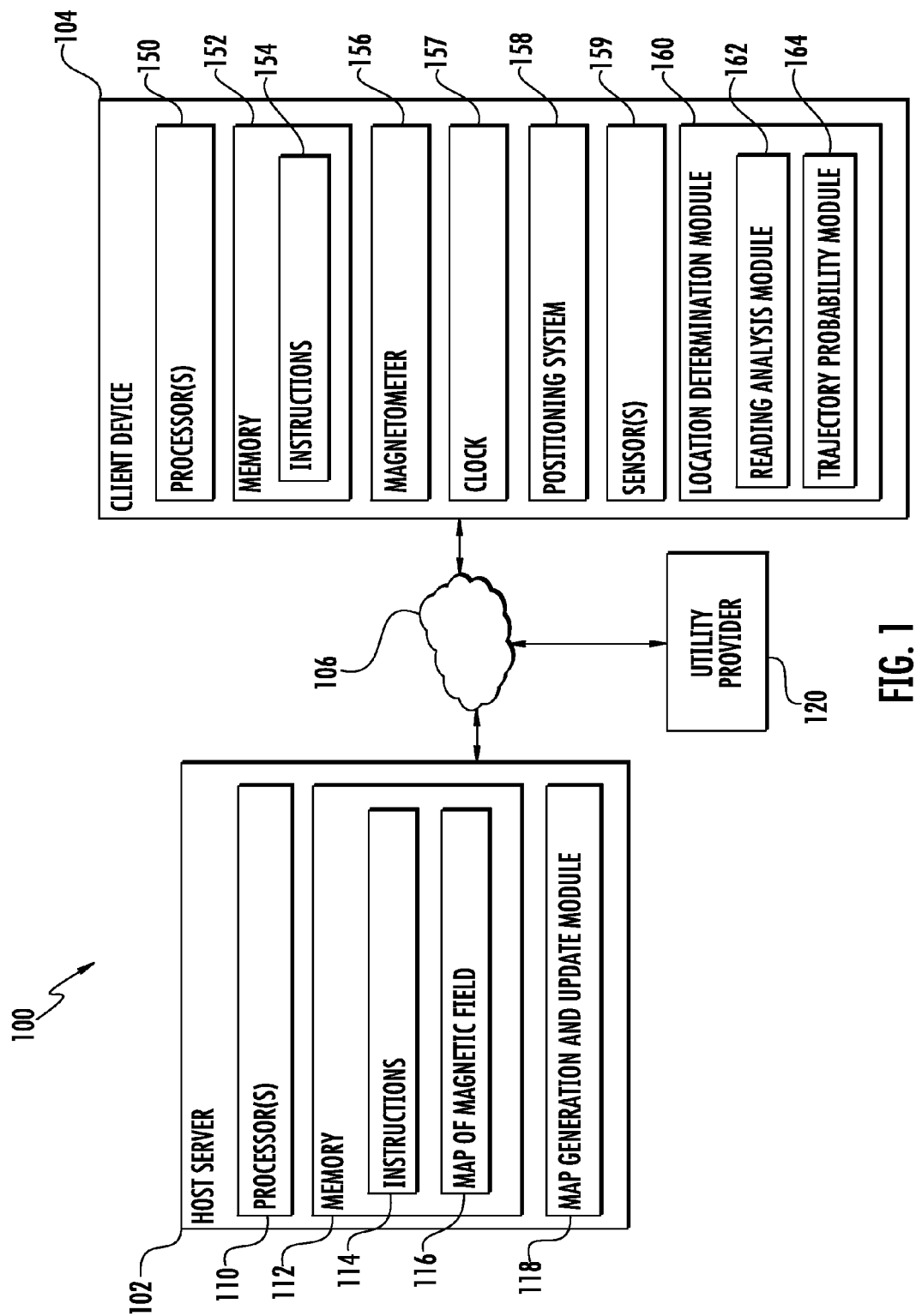
FIG. 1 depicts an example system for determining a location of a device according to an example embodiment of the present disclosure.

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made to the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Overview

Generally, the present disclosure is directed to systems and methods for determining or estimating a location of a device using magnetic field readings. Each magnetic field reading collected by the device over time can be analyzed to determine a plurality of characteristics of the magnetic field. In particular, one or more of the plurality of characteristics can describe a component of the magnetic field that oscillates at a frequency associated with alternating current power lines. The plurality of characteristics for each reading can be compared to expected values respectively associated with a plurality of locations and provided by a map of the magnetic field to determine a location probability for each of the plurality of locations. Thus, the location probability for each location and time can be derived from the magnetic field measurement taken at such time and can represent the knowledge gained from such measurement. Specifically, the location probability for each location and time can provide a probability that the magnetic field reading for such time was collected at such location. In further embodiments, the magnetic field readings collected by the device over time can be analyzed in conjunction with other data or constraints to determine a trajectory probability for each of a plurality of trajectories. In addition, the map can be updated using the collected readings and the determined trajectory probabilities. In such fashion, magnetic fields generated by alternating current power lines can be used to assist in determining a location of the device.

More particularly, a device that includes or has thereto attached a magnetometer, such as, for example, a smartphone or navigational device, can collect readings of a magnetic field over time as it travels about the world. For example, each reading can describe the strength of magnetic field surrounding the device in three dimensions. In some implementations, the device can sample the magnetic field about 120 times or more per second and the samples can be grouped into readings that correspond to about one second intervals.

According to an aspect of the present disclosure, each reading of the magnetic field can be analyzed to determine a plurality of characteristics of the magnetic field, with one or more of the plurality of characteristics describing a component of the magnetic field that oscillates at a frequency associated with alternating current power lines.

Further, in some embodiments of the present disclosure, the orientation of the device at the time each reading was captured can be generally known (e.g. based on data obtained from a compass, gyroscope, and/or accelerometer of the device). In such embodiments, each reading of the magnetic field can first be rotated from a device coordinate frame to a global coordinate frame based on the corresponding orientation. The plurality of characteristics can then be determined based on the rotated readings.

As an example, the plurality of characteristics can include an x-axis amplitude, a y-axis amplitude, a z-axis amplitude, an x-axis phase value, a y-axis phase value, and a z-axis phase value of the component of the magnetic field that oscillates at such frequency.

As an example, a model waveform can be fitted to each dimension of each reading and the plurality of characteristics can be determined based on the fitted readings. For example, the model waveform can be a sine wave having the frequency associated with the alternating current power lines.

As another example, a digital filter can be applied to each reading to isolate the component of the magnetic field that oscillates at the frequency associated with the alternating current power lines. The plurality of characteristics can then be determined based on the filtered readings. For example, the digital filter can be a bandpass filter that passes the frequency associated with the alternating current power lines.

Furthermore, in some embodiments of the present disclosure, additional characteristics of an additional component of the magnetic field that exhibits a frequency at about zero can be determined for each reading. For example, an offset x-axis amplitude, an offset y-axis amplitude, and an offset z-axis amplitude can be determined for each reading.

In other embodiments of the present disclosure, the particular orientation of the device at the time each reading is captured may be unknown or may be unable to be determined with sufficient precision. In such embodiments, the plurality of characteristics determined for each reading can be orientation-independent or otherwise not substantially affected by the orientation of the device at the time of capture.

As an example, the plurality of characteristics determined for each reading can include the dot product of a DC vector and in-phase vector, the dot product of the DC vector and an out-of-phase vector, and the dot product of the in-phase vector and the out-of-phase vector. Further, in some implementations, the plurality of characteristics can further include the angles between each pair of the DC vector, the in-phase vector, and the out-of-phase vector.

In particular, the DC vector for each reading can describe the component of the magnetic field that exhibits a frequency at about zero. The in-phase vector for each reading can be equal to a time average of the cosine of a phase angle value times an AC vector describing the component of the magnetic field that exhibits the frequency associated with the alternating current power lines. The out-of-phase vector can be equal to a time average the sine of the phase angle value times the AC vector. The phase angle value can be retrieved from a map of the magnetic field, as will be discussed further later.

In such fashion, the plurality of characteristics can be determined for each reading without knowledge of the orientation of the device at the time of reading capture.

In yet other embodiments of the present disclosure, the particular orientation of the device at the time each reading is captured may be unknown except that the direction of the pull of gravity with respect to the device coordinate frame may be known with sufficient precision (e.g. based on data obtained from an accelerometer of the device). In such embodiments, the plurality of characteristics of the magnetic field can leverage knowledge of the downwards direction and can be orientation-independent or otherwise substantially unchanging if the device is rotated about a vertical axis.

As an example, in such embodiments, the plurality of characteristics determined for each reading can include a vertical portion of each of the DC vector, the in-phase vector, and the out-of-phase vector, the dot product of a horizontal plane portion of the DC vector and a horizontal plane portion of the in-phase vector, the dot product of the horizontal plane portion of the DC vector and a horizontal plane portion of the out-of-phase vector, and a dot product of the horizontal plane portion of the in-phase vector and the horizontal plane portion of the out-of-phase vector.

Further, in some implementations, the plurality of characteristics can further include the angles between each pair of the horizontal plane portion of the DC vector, the horizontal plane portion of the in-phase vector, and the horizontal plane portion of the out-of-phase vector.

In such fashion, the plurality of characteristics determined for each reading can leverage knowledge of the direction of the pull of gravity relative to the device without requiring knowledge of the exact orientation of device at the time of capture.

According to another aspect of the present disclosure, the plurality of characteristics for each reading can be compared to a plurality of expected values associated with each of a plurality of locations to assist in determining a location of the device at the time each reading was collected.

More particularly, according to another aspect of the present disclosure, a map of expected values of the magnetic field can be generated, maintained, and consulted over time. The map can provide an expected value for each of the plurality of characteristics of the magnetic field for each time and potential location. In addition, the same or an additional map can provide a phase angle value for each time and potential location so that certain of the previously discussed magnetic field characteristics can be determined.

Thus, by comparing the determined characteristics of each collected reading to expected values associated with each of the plurality of locations, the location of the device at the time each reading was collected can be estimated or otherwise determined. For example, a location probability can be determined for each of the plurality of locations. The location probability for each location can be a function of the difference between the plurality of determined characteristics and the plurality of expected values for such location.

In particular, as an example, three-dimensional space around the device can be divided into a plurality of locations in the form of a plurality of cubes. As another example, the plurality of locations can correspond to a plurality of squares and elevation can be held constant or simply ignored. For example, each cube can be one meter cubed or each square can be one meter squared. Thus, for each location and each time, a location probability can be computed.

According to another aspect of the present disclosure, a plurality of magnetic field readings collected over time can be analyzed to determine a trajectory of the device through two or three-dimensional space. In particular, the most probable path of the device can be reconstructed by analyzing a series of magnetic field readings in conjunction with speed and acceleration data or other constraints regarding position, such as knowledge concerning building layouts.

In particular, a trajectory probability can be determined for each of a plurality of candidate trajectories. Each candidate trajectory can specify a sequence of locations over the plurality of times respectively associated with the series of magnetic field readings. Further, in some implementations, each candidate trajectory can further specify a plurality of orientations of the device respectively associated with the sequence of locations.

As an example, the trajectory probability for each candidate trajectory can be based at least in part on the location probability associated with each location specified by such candidate trajectory at the time specified by such candidate trajectory. For example, each location probability for each location and time can be determined by comparing the plurality of characteristics determined based on the magnetic field reading collected at such time with the expected values obtained for such location and time from a map of the magnetic field, as discussed above.

As another example, the trajectory probability for each candidate trajectory can be based at least in part on a transition probability for each location specified by such candidate trajectory at the time specified by such candidate trajectory. The transition probability for each location can provide the probability that the device relocated from such location to the next sequential location specified by the candidate trajectory.

For example, each transition probability can be determined based on data from accelerometers included in the device. As another example, each transition probability can be determined based on other constraints such as a maximum speed at which the device is expected to travel or constraints generated based on knowledge of a floorplan of a building in which the device is located.

In some implementations, the trajectory probability can be determined for each candidate trajectory by considering both the location probability and transition probability for each pair of location and time specified by such candidate trajectory. Over time, the number of candidate trajectories which receive a not-insignificant trajectory probability can be reduced to a relatively small set of candidate trajectories, with each candidate trajectory having a corresponding trajectory probability. Further, in some implementations, the most recent location specified by the candidate trajectory having the largest trajectory probability can be selected or recognized as the location of the device.

In addition, in some implementations, once a particular location has been selected or recognized as the location of the device, an error circle can be generated by considering the respective distances from the other less-probable locations to the most-probable location.

According to another aspect of the present disclosure, the map of the magnetic field can be updated based on the obtained magnetic field readings and the candidate trajectories. In particular, in some implementations, the map of the magnetic field can be stored and maintained at a server or other central computing device. A plurality of devices can implement the location determination methods described herein and can report back to the central computing device with their respective collected magnetic field readings and determined candidate trajectories and trajectory probabilities. The central computing device can then update the map of the magnetic field based on the received data.

As an example, the map of the magnetic field can be updated by averaging the plurality of determined characteristics with the existing expected values provided by the map. For example, the map can be updated based on each candidate trajectory with a trajectory probability greater than a threshold value. For example, the threshold value can be a factor F times the probability of the most probable candidate trajectory, where F is less than one. In addition, the influence of each candidate trajectory on the map can be proportional to the trajectory probability associated with such candidate trajectory.

In particular, for embodiments in which the plurality of determined characteristics are dependent upon the orientation of the device at this time of capture, the plurality of characteristics, as rotated into the global coordinate frame, can be used to update the map. For embodiments in which the plurality of determined characteristics are independent of orientation of the device at the time of capture, rotation to a particular coordinate system is not required.

As another example, a weighted average of the expected values and the plurality of determined characteristics for each of the collected magnetic field readings can be computed with the weighting of the expected values corresponding to a number of updates that have contributed to the formation of such expected values. As yet another example, the weighting of the expected values can correspond to a confidence value that indicates the overall confidence or uncertainty of the expected values provided by the map at each location.

Furthermore, in some implementations, map squares or cubes which surround a location included in a candidate trajectory can be updated as well, so as to prevent a phenomenon known as "trench digging." Thus, locations that are near to a particular location specified by a candidate trajectory can be updated based on the collected magnetic field readings. In such fashion, a map of expected magnetic field values can be accurately updated and maintained over time.

Example Systems

With reference now to the FIGS., example embodiments of the present disclosure will be discussed in further detail. FIG. 1 depicts an example system 100 for determining a location of a device according to an example embodiment of the present disclosure. System 100 can include a host server 102 in communication with one or more client devices 104 over a network 106.

Host server 102 can include one or more computing devices. Furthermore, any computing tasks or functionality provided by host server 102 can performed by the one or more computing devices in any combination of a parallel or distributed computing environment.

Host server 102 can include one or more processors 110 and a memory 112. Processor 110 can be one processor or can be a plurality of processors which are operably connected. The memory 112 can store instructions 114 that, when executed by processor 110, cause processor 110 to perform operations in accordance with the present disclosure.

Memory 112 can also include a map of a magnetic field 116. The map 116 can be implemented across one or more storage devices and can be located locally or located remotely and accessed over network 106. The map of the magnetic field 116 can provide expected values for a plurality of characteristics of the magnetic field at any location and time. The expected values can correspond to any of the various plurality of characteristics discussed above.

As an example, expected values provided by map 116 can include a first plurality of expected values of a first component of the magnetic field that oscillates at a frequency associated with alternating current power lines and a second plurality of expected values associated with a second component of the magnetic field that exhibits about zero frequency.

In particular, the first plurality of expected values can include an expected x-axis amplitude, an expected y-axis amplitude, an expected z-axis amplitude, an expected x-axis phase value, an expected y-axis phase value, and an expected z-axis phase value of the first component that oscillates at the frequency associated with alternating current power lines.

For example, the expected phase values for each location can be expressed as an expected phase angle of the each dimension of the first component (e.g. the component having the frequency associated with alternating current power lines) of the magnetic field present at such location at a particular instant in time. Alternatively, the expected phase values for each location can be expressed as a degree to which each dimension of the first component of the magnetic field present at such location is out-of-phase with a reference signal or a reference alternating current power line.

The second plurality of expected values can include an expected offset x-axis amplitude, an expected offset y-axis amplitude, and an expected offset z-axis amplitude of the second component of the magnetic field that exhibits a frequency about zero.

As another example, the expected values provided by map 116 for each time and location can include an expected dot product of a DC vector and in-phase vector, an expected dot product of the DC vector and an out-of-phase vector, and an expected dot product of the in-phase vector and the out-of-phase vector. Further, in some implementations, the plurality of expected values can further include expected angles between each pair of the DC vector, the in-phase vector, and the out-of-phase vector. In addition, in some implementations, an expected angle between a given pair of vectors can be stored or expressed in the form of the magnitude of the cross-product between such pair of vectors.

As yet another example, the expected values provided by map 116 for each time and location can include an expected vertical portion of each of the DC vector, the in-phase vector, and the out-of-phase vector, an expected dot product of a horizontal plane portion of the DC vector and a horizontal plane portion of the in-phase vector, an expected dot product of the horizontal plane portion of the DC vector and a horizontal plane portion of the out-of-phase vector, and an expected dot product of the horizontal plane portion of the in-phase vector and the horizontal plane portion of the out-of-phase vector.

Further, in some implementations, the plurality of expected values can further include expected angles between each pair of the horizontal plane portion of the DC vector, the horizontal plane portion of the in-phase vector, and the horizontal plane portion of the out-of-phase vector. In addition, in some implementations, as noted above, expected angles between a given pair of vectors can be stored or expressed in the form of the magnitude of the cross-product between such pair of vectors.

Thus, in some implementations, the map of the magnetic field 116 can simply provide the expected values for one or more specific characteristics of the magnetic field, as noted above. Therefore, the present disclosure does not require map of the magnetic field 116 to provide any particular cartographic information, visualization, or navigation of the magnetic field.

Further, in some implementations of the present disclosure, the map of the magnetic field 116 can be segmented into two or more maps (e.g. databases) that respectively provide expected values for two or more characteristics of the magnetic field. For example, in some implementations, a first map 116 can provide expected phase value characteristics while a second map 116 can provide expected values related to field strength and/or direction.

According to an aspect of the present disclosure, the map of the magnetic field 116 can be built, updated, and maintained over time based on feedback, such as, for example, collected magnetic field readings, from one or more client devices 104. Other data or feedback can be used to build the map 116 as well. For example, data describing building locations, floorplans, and/or alternating current power line locations can be used to build the map 116.

As another example, host server 102 can access over network 106 or otherwise communicate with one or more utility providers 120. The utility providers, such as power generation utilities, can provide host server 102 with data regarding current phase values of output utility power. Such information regarding up-to-date phase values of output utility power can be used to update the map 116.

As yet another example, in some implementations, devices designed specifically for the collection of magnetic field data for the generation of map 116 can be employed to assist in generating map 116. As another example, in some implementations, one or more client devices 104 can be configured to operate an optical sensor to detect phase values of the alternating current power lines as indicated by a flicker exhibited by fluorescent lamps.

In some implementations, the map 116 can include or provide additional information concerning each expected value. For example, map 116 can include or provide an error value representative of an error bar for each expected value. As another example, map 116 can include or provide an update number that indicates a number of collected readings that have contributed to the map at each location or for each expected value. As yet another example, map 116 can include or provide a confidence score that indicates the overall confidence or uncertainty for the expected values at each location.

The map of the magnetic field 116 can be implemented using many different formats or levels of interactivity. In some implementations, the map 116 is implemented by storing expected amplitude values for each location and then providing the expected phase values for each location as a function of time. In some implementations, the expected amplitude values for all three dimensions can be expressed as a single vector quantity.

Host server 102 can also include any number of modules which provide additional functionality, including, for example, a map generation and update module 118. Host server 102 can implement map generation and update module 118 to perform operations to generate and update the map of the magnetic field 116. For example, in some implementations, map generation and update module 118 can be implemented to receive magnetic field data, associate such data with a particular location, and store such data in the map of the magnetic field 116.

As another example, in some implementations, map generation and update module 118 can be implemented to receive collected readings of a magnetic field and average such collected readings with existing expected values according to one or more update algorithms. Example update algorithms can take into account error values, update numbers, or confidence scores provided by map 116 and associated with particular expected values or locations. In addition, in some implementations, map generation and update module 118 can rotate received readings to a global coordinate frame according to respective orientation information prior to using such readings to update the map.

As another example, update algorithms can take into account trajectory probabilities or location probabilities associated with particular collected magnetic field readings. For example, an example update algorithm can perform a weighted average of collected magnetic field readings with existing expected values, with the weighting of each of such items being based on the error, confidence, and/or probability values discussed above.

It will be appreciated that the term "module" refers to computer logic utilized to provide desired functionality. Thus, a module can be implemented in hardware, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or optical or magnetic media.

Client device 104 can include one or more processors 150 and a memory 152. Processor 150 can be one processor or a plurality of processors operably connected. The memory 152 can store instructions 154 that, when executed by processor 150, cause processor 150 to perform operations in accordance with the present disclosure.

Client device 104 can be a smartphone, a computing device included in a self-driving car, a computing device attached to or included in a wearable item, a camera, a component of a military vehicle, an aircraft, a navigational device, an emergency location broadcast device, a robotic device, or any other device or system for which knowledge of the location of the device or system is beneficial. In addition, although a single client device 104 is shown in FIG. 1, any number of client devices 104 can communicate with host server 102 over network 106.

Client device 104 can include a magnetometer 156, a clock 157, a positioning system 158, and one or more sensor(s) 159. Magnetometer 156 can be any measuring instrument capable of measuring strength and direction of a magnetic field. Magnetometer 156 can be a single sensor, instrument, or device or can be a plurality of devices operably connected. For example, magnetometer 156 can be three approximately perpendicular magnetometers operatively connected. In some implementations, magnetometer 156 can output a reading of the magnetic field surrounding magnetometer 156 in the form of a three-dimensional magnetic field vector defined with respect to a local coordinate frame associated with client device 104. Further, in some implementations, client device 104 can include two or more magnetometers spaced at various positions throughout the device.

Clock 157 can be any device or component for keeping or providing an accurate indication of the current time. For example, clock 157 can be a real-time clock. In some implementations, clock 157 can receive updates or be synced according to communications received from host server 102.

According to an aspect of the present disclosure, for each instance in which client device 104 operates magnetometer 156 to collect a magnetic field reading, client device 104 can associate the current time, as indicated by clock 157, with such collected reading. As an example, client device 104 can operate magnetometer 156 to sample the magnetic field about 120 times or more per second and the samples can be grouped into readings that correspond to about one second intervals. However, such values are provided by way of example only, and many other configurations can be used.

Positioning system 158 can determine a current geographic location of client device 104. The positioning system 158 can be any device or circuitry for analyzing the position of the client device 104. For example, the positioning system 158 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

Sensor(s) 159 can be any device or instrumentation for collecting additional information to assist in determining a location or an orientation of client device 104 or describing movement of client device 104. For example, sensor(s) 159 can include a gyroscope, a compass, one or more accelerometers, an optical sensor, and/or one or more inertial measurement units. For example, sensor(s) 159 can be used to determine the orientation of client device 104 in three-dimensional space. Further, in some implementations, client device 104 can use sensor(s) 159 to determine the direction of gravity relative to the device 104.

As another example, according to an aspect of the present disclosure, data from sensor(s) 159, such as, for example, accelerometers, can be analyzed to assist in determining a transition probability for each pair of sequential locations specified by a candidate trajectory, as will be discussed further below.

Client device 104 can also include a location determination module 160. Client device 104 can implement location determination module 160 to determine a location of device 104 based on magnetic field readings collected by magnetometer 156.

Location determination module 160 can include a reading analysis module 162. Reading analysis module 162 be implemented to rotate a magnetic field reading from a device coordinate frame to a global coordinate frame based on an orientation of client device 104.

Reading analysis module 162 can also be implemented to determine a plurality of characteristics of one or more components of the magnetic field reading. For example, in some implementations, reading analysis module 162 can be implemented to fit a model waveform to one or more dimensions of the magnetic field reading. As another example, reading analysis module 162 can include one or more filters, such as, for example, a digital bandpass filter or a digital high-pass filter. As yet another example, reading analysis module 162 can be implemented to perform one or more frequency domain transformations to isolate a component of a magnetic field reading that oscillates at a particular frequency.

In other embodiments, reading analysis module 162 can be implemented to perform additional tasks. For example, reading analysis module 162 can be implemented to compute various dot products of determined vectors or compute angles or cross-products associated with given pairs of vectors. As another example, in some embodiments, reading analysis module 162 can be implemented to identify the magnitude of a vertical portion of each of a plurality of vectors and the compute dot products, angles, and cross-products between pairs of horizontal plane portions of such plurality of vectors.

Location determination module 160 can also include a trajectory probability module 164. As an example, in some implementations, trajectory probability module 164 can be implemented to identify a plurality of candidate trajectories and to determine a trajectory probability for each of such candidate trajectories.

Client device 104 can transmit data to host server 102 over network 106. For example, client device 104 can provide magnetic field readings, candidate trajectories, and trajectory probabilities to host server 102. As an example, such transmitted information can be used by map update module 118 to update the map of the magnetic field 116.

Network 106 can be any type of communications network, such as a local area network (e.g., intranet), wide area network (e.g., Internet), or some combination thereof and can include any number of wired or wireless links. In general, communication between the host server 102 and client device 104 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Furthermore, while host server 102 and client device 104 are depicted in FIG. 1 as being separate systems, such depiction is provided by way of example only. In particular, in some embodiments of the present disclosure, host server 102 can be a component of or otherwise included in client device 104. Likewise, components or functionality shown as included in host server 102 can be included in client device 104 and vice versa. In addition, determination or refinement of the location of client device 104 by host server 102 or by client device 104 can be performed in real-time or can be performed as post-data collection batch processing.

Example Processes

Figure 2:
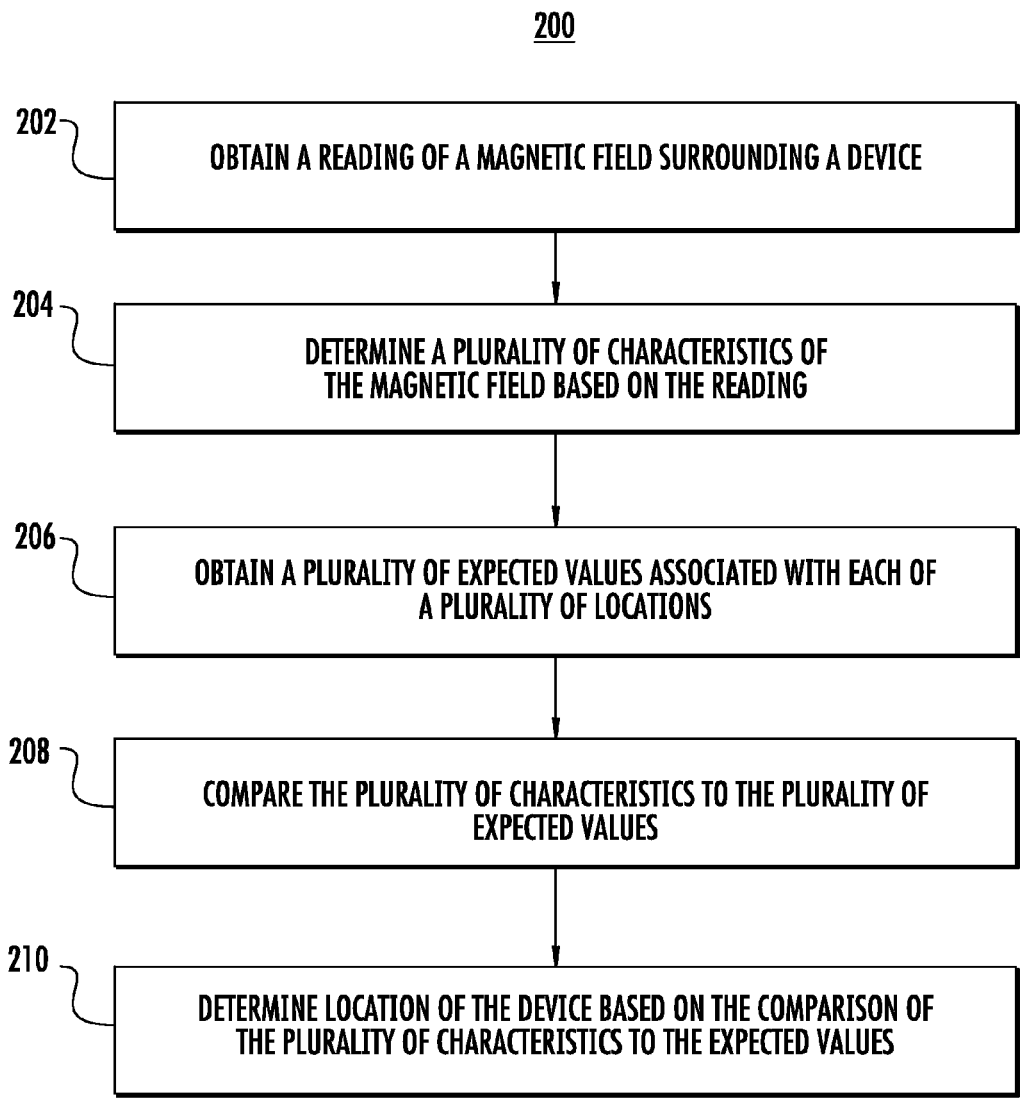
FIG. 2 depicts an example method for determining a location of a device according to an example embodiment of the present disclosure.

FIG. 2 depicts a flow chart of an example method (200) for determining the location of a device according to an example embodiment of the present disclosure. Although method (200) will be discussed with reference to system 100 of FIG. 1, method (200) can be performed by any suitable computing system.

In addition, FIG. 2 depicts steps performed in a particular order for purposes of illustration and discussion. Those of ordinary skill in the art, using the disclosures provided herein, will understand that the various steps of method (200) can be omitted, adapted, and/or rearranged in various ways without departing from the scope of the present disclosure.

At (202) a reading of a magnetic field surrounding a device can be obtained. For example, client device 104 can operate magnetometer 156 to collect a reading of the magnetic field surrounding client device 104. In particular, in some implementations, the collected reading can consist of about 120 or more samples collected over a period of about one second. Each sample output by magnetometer 156 can be in the form of a three-dimensional vector.

At (204) a plurality of characteristics of the magnetic field can be determined based at least in part on the reading collected at (202). In particular, one or more of the plurality of characteristics can describes a component of the magnetic field that oscillates at a frequency associated with alternating current power lines. For example, the frequency associated with alternating current power lines can be about 50 or 60 Hertz.

In particular, in some embodiments of the present disclosure, the orientation of the device at the time the reading was collected at (202) can be generally known (e.g. based on data obtained from a compass, gyroscope, and/or accelerometer of the device). As another example, as will be discussed further below, orientation can be treated as an unknown similar to location, and therefore the reading can be rotated according to a plurality of candidate orientations for comparison to expected values.

In such embodiments in which orientation is known or treated as a known variable value, the reading can be rotated from a device coordinate frame to a global coordinate frame based on the known orientation of the device in three-dimensional space or the candidate orientation. As an example, client device 104 can operate sensor(s) 159, such as, for example, a gyroscope, accelerometer, or compass, to determine an orientation of client device 104 in three-dimensional space. Therefore, one or more rotation matrices can be formed to assist in rotating each sample in the reading.

In such embodiments, the plurality of characteristics that are determined at (204) can include an x-axis amplitude, a y-axis amplitude, a z-axis amplitude, an x-axis phase value, a y-axis phase value, and a z-axis phase value of the component of the magnetic field that oscillates at the frequency associated with alternating current power lines. For example, the phase value for each dimension of the reading can be the phase of such dimension at a particular, selected instant within the reading.

As an example, in some implementations, client device 104 can fit a model waveform to each dimension of the magnetic field reading to obtain a fitted reading. The model waveform can be a sine wave having the frequency associated with the alternating current power lines. The plurality of characteristics can then be determined based on the fitted reading.

For example, as discussed above, the reading can consist of a plurality of samples, with each sample being a three-dimensional vector having been rotated to the global coordinate frame. Thus, for example, the three dimensions of the reading can be separated to form three digital signals and the model waveform can be fitted to each of such digital signals.

As another example, at (204) the client device 104 can apply one or more filters, such as, for example, a digital filter, to the magnetic field reading to isolate the component of the magnetic field that oscillates at the frequency associated with the alternating current power lines. The plurality of characteristics can then be determined based on the filtered reading.

In addition, in some implementations, at (204) a second plurality of characteristics of a second component of the magnetic field that oscillates at a frequency at about zero can be determined. In particular, the second plurality of characteristics can include an offset x-axis amplitude, an offset y-axis amplitude, and an offset z-axis amplitude associated with the second component. For example, the methods discussed above, such as, for example, fitting of a model waveform or application of a digital filter, can be applied to determine the second plurality of characteristics.

In other embodiments of the present disclosure, the particular orientation of the device at the time the reading was captured at (202) may be unknown or may be unable to be determined with sufficient precision. In such embodiments, the plurality of characteristics determined for the reading at (204) can be orientation-independent or otherwise not substantially affected by the orientation of the device at the time of capture.

As an example, the plurality of characteristics determined at (204) can include the dot product of a DC vector and in-phase vector, the dot product of the DC vector and an out-of-phase vector, and the dot product of the in-phase vector and the out-of-phase vector. Further, in some implementations, the plurality of characteristics can further include the angles between each pair of the DC vector, the in-phase vector, and the out-of-phase vector.

In particular, the DC vector can describe the component of the magnetic field reading captured at (202) that exhibits a frequency at about zero. The in-phase vector can be equal to a time average of the cosine of a phase angle value times an AC vector describing the component of the magnetic field that exhibits the frequency associated with the alternating current power lines. The out-of-phase vector can be equal to a time average of the sine of the phase angle value times the AC vector. The phase angle value can be retrieved from a map of the magnetic field.

In such fashion, the plurality of characteristics can be determined at (204) without knowledge of the orientation of the device at the time of reading capture at (202).

In yet other embodiments of the present disclosure, the particular orientation of the device at the time the reading was captured at (202) may be unknown except that the direction of the pull of gravity with respect to the device coordinate frame may be known with sufficient precision (e.g. based on data obtained from an accelerometer of the device). In such embodiments, the plurality of characteristics of the magnetic field can leverage knowledge of the downwards direction and can be otherwise orientation-independent or otherwise substantially unchanging if the device is rotated about a vertical axis.

As an example, in such embodiments, the plurality of characteristics determined at (204) can include a vertical portion of each of the DC vector, the in-phase vector, and the out-of-phase vector, the dot product of a horizontal plane portion of the DC vector and a horizontal plane portion of the in-phase vector, the dot product of the horizontal plane portion of the DC vector and a horizontal plane portion of the out-of-phase vector, and a dot product of the horizontal plane portion of the in-phase vector and the horizontal plane portion of the out-of-phase vector.

Further, in some implementations, the plurality of characteristics determined at (204) can further include the angles between each pair of the horizontal plane portion of the DC vector, the horizontal plane portion of the in-phase vector, and the horizontal plane portion of the out-of-phase vector.

In such fashion, the plurality of characteristics determined at (204) can leverage knowledge of the direction of the pull of gravity relative to the device without requiring knowledge of the exact orientation of device at the time of capture at (202).

At (206) a plurality of expected values associated with each of a plurality of locations can be obtained. As an example, client device 104 can operate or have previously operated positioning system 158 to determine a coarse location of client device 104. Thus, at (206) client device 104 can communicate with host server 102 to obtain a plurality of expected values associated with each of a plurality of locations surrounding such coarse location.

In particular, client device 104 can request the expected values associated with each of the plurality of locations at a particular instant in time. Host server 102 can retrieve the requested expected values from the map of the magnetic field 116 and serve such expected values to client device 104 over network 106.

At (208) the plurality of characteristics determined at (204) can be compared to the plurality of expected values obtained at (206). As an example, at (208) a location probability can be determined for each of the plurality of locations for which expected values were obtained at (206). In particular, the location probability for each location can be a function of a difference between the plurality of characteristics determined at (204) and the expected values for such location obtained at (206). For example, the function can be a multivariate Gaussian function.

At (210) the location of the device can be determined based at least in part on the comparison performed at (208). For example, the location which received the largest location probability at (208) can be selected as the location of the device or otherwise acknowledged as the best available estimate. As another example, a weighted average of the plurality of locations can be computed at (210), with each location's weight corresponding to its respective location probability. The location that results from the weighted average can be selected as the location of the device at the time the reading was collected or otherwise acknowledged as the best available estimate of the location of the device at the time the reading was collected.

In such fashion, a reading of the magnetic field can be used to determine the location of the device. In particular, the component of the magnetic field generated by alternating current power lines can be used to determine the location of the device.

Figure 3:
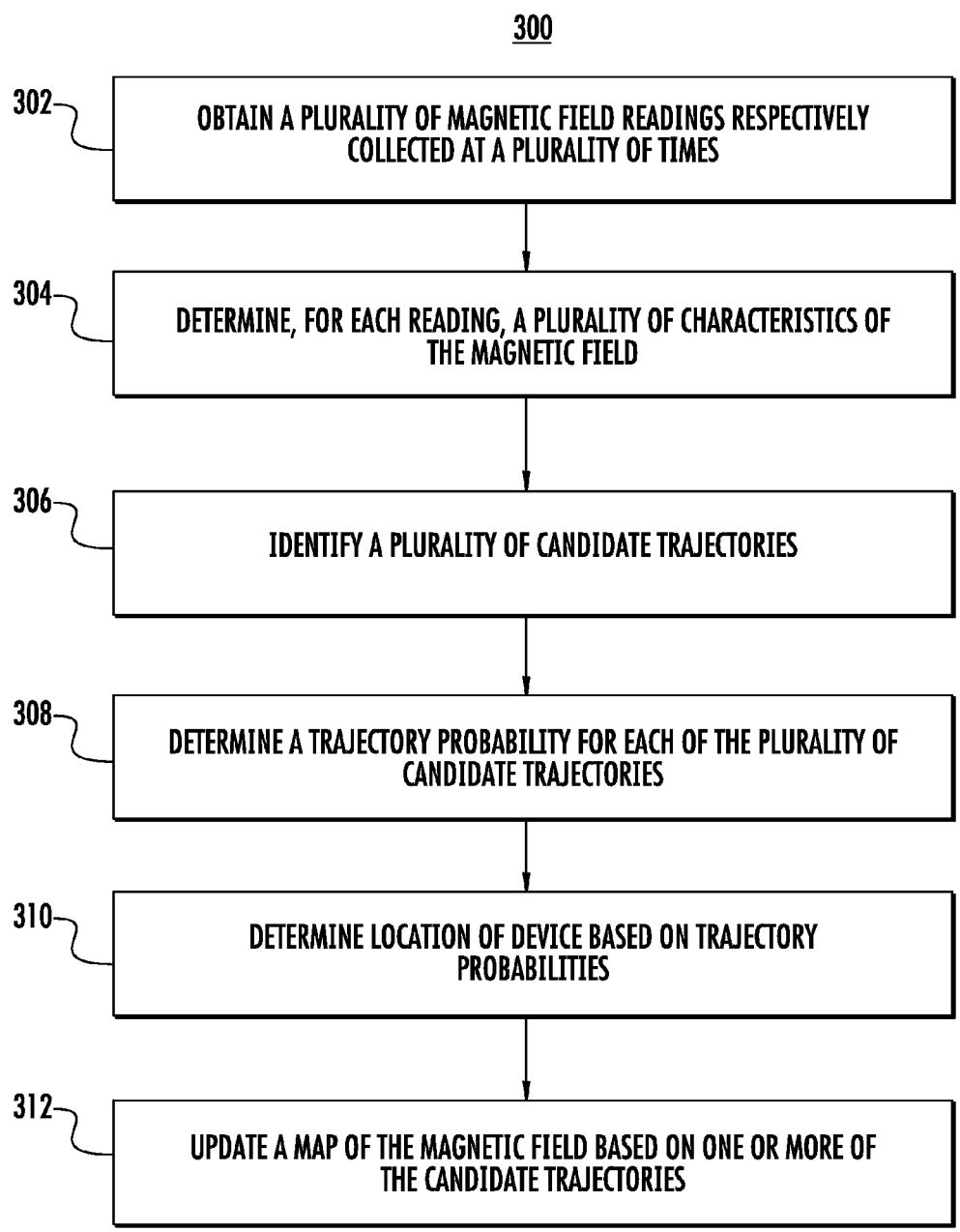
FIG. 3 depicts an example method for determining a location of a device according to an example embodiment of the present disclosure.

FIG. 3 depicts a flow chart of an example method (300) for determining the location of a device according to an example embodiment of the present disclosure. Method (300) can be performed by any suitable computing system, including example system 100 of FIG. 1.

In addition, FIG. 3 depicts steps performed in a particular order for purposes of illustration and discussion. Those of ordinary skill in the art, using the disclosures provided herein, will understand that the various steps of method (300) can be omitted, adapted, and/or rearranged in various ways without departing from the scope of the present disclosure.

At (302) a plurality of magnetic field readings respectively collected at a plurality of times can be obtained. For example, an example device can operate a magnetometer to collect a plurality of readings of a magnetic field surrounding the device at a plurality of times. As an example, each reading can include a plurality of samples of the magnetic field, with each sample being a three-dimensional vector.

At (304) a plurality of characteristics the magnetic field can be determined for each reading obtained at (302). In particular, one or more of the plurality of characteristics can describe a component of the magnetic field that oscillates at a frequency associated with alternating current power lines. As an example, one or more of the methods or techniques discussed with reference to (204) of FIG. 2 can be performed with respect to each reading at (304).

As an example, the plurality of characteristics determined for each reading at (304) can include an x-axis amplitude, a y-axis amplitude, a z-axis amplitude, an x-axis phase value, a y-axis phase value, and a z-axis phase value of the component of the magnetic field that oscillates at the frequency associated with alternating current power lines.

In addition, in some implementations, the plurality of characteristics determined for each reading at (304) can include an offset x-axis amplitude, an offset y-axis amplitude, and an offset z-axis amplitude associated with a second component of the magnetic field that oscillates at a frequency at about zero.

At (306) a plurality of candidate trajectories can be identified. Each candidate trajectory can specify one of a plurality of locations at each of a plurality of times. Thus, each candidate trajectory provides a sequence of location over the plurality of times and can represent a candidate trajectory of the device through two or three-dimensional space.

Furthermore, in some embodiments, each candidate trajectory can specify an orientation for each location in the sequence of locations. Thus, in such embodiments, determining the plurality of characteristics for each reading at (304) can include rotating each reading according to each orientation specified by each of the plurality of candidate trajectories in order to determine the appropriate characteristics for subsequent comparison to expected values for such candidate trajectories. Thus, the transition probability for each pair of locations can depend upon the change in the orientation from the primary location to the subsequent location. Furthermore, it will be appreciated that various steps of method (300) can be performed simultaneously or in alternating portions.

In some implementations, method (300) can be performed in an iterative fashion. Thus, in such implementations, the plurality of candidate trajectories identified at (306) can include or be based on a set of candidate trajectories obtained from the previous iteration of method (300).

As another example, the plurality of candidate trajectories can be generated or identified based on one or more previously obtained coarse locations of the device in conjunction with one or more constraints, such as, for example, knowledge regarding a building layout, data obtained from one or more device sensors such as accelerometers, or other data.

Figure 5:
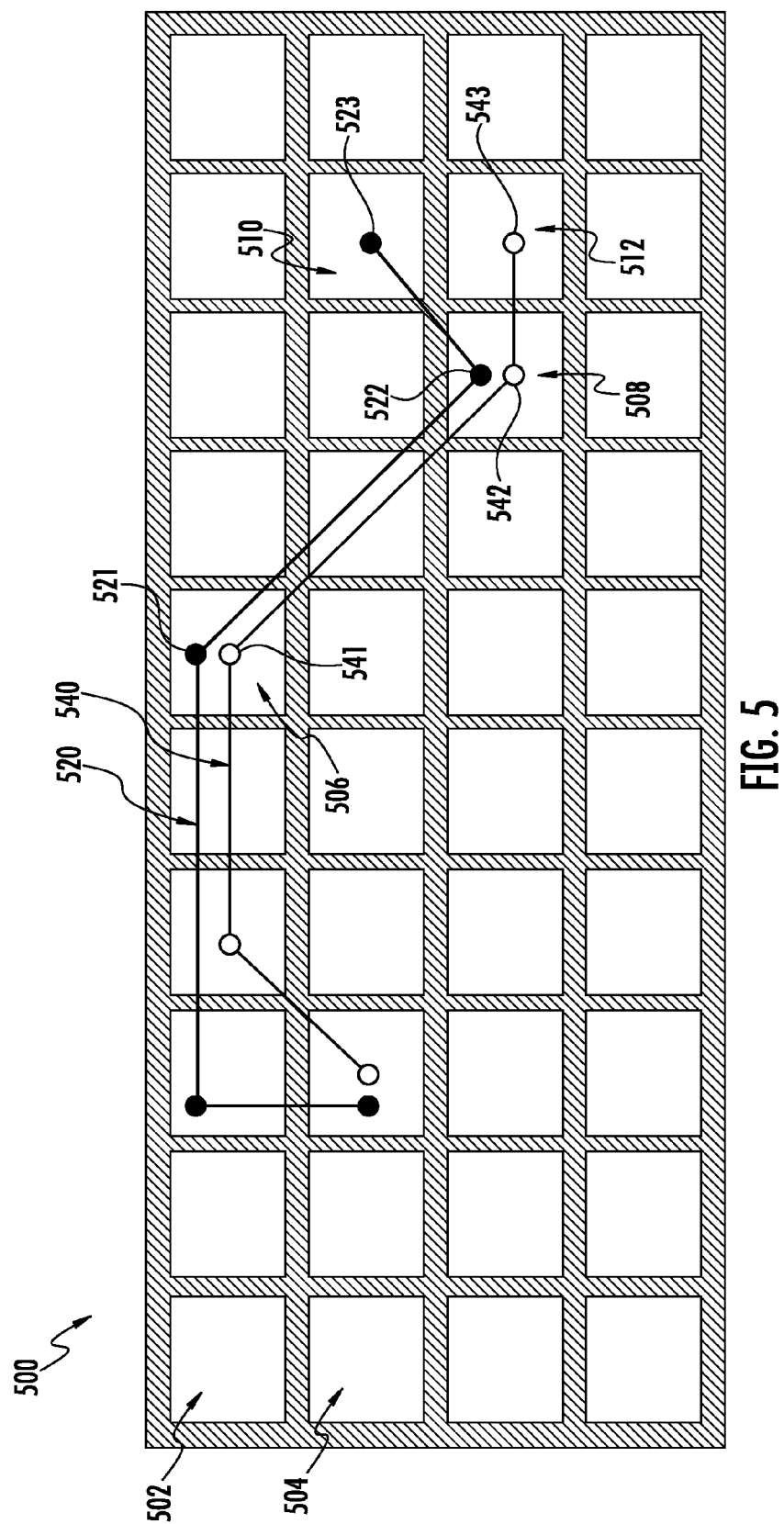
FIG. 5 depicts an example illustration of two candidate trajectories according to an example embodiment of the present disclosure.

As an example, FIG. 5 depicts an example illustration 500 of two candidate trajectories 520 and 540 according to an example embodiment of the present disclosure. In particular, illustration 500 depicts two-dimensional space divided into a plurality of locations, such as, for example, locations 502 and 504. Each location can be a 1 meter by 1 meter square. Thus, each location can correspond to a designated area.

However, other divisions of space into locations can be used. As an example, each location can be a 30 centimeter by 30 centimeter square. As another example, the locations can be arbitrary and/or non-identical. For example, the locations can be smaller in areas where the magnetic fields change more rapidly over space. As yet another example, the locations can represent divisions of three-dimensional space. Thus, each location can correspond to a designated volume.

Candidate trajectories 520 and 540 each specify a sequence of location respectively associated with a plurality of times. As an example, at time $(t_1-2)$ candidate trajectory 520 specifies location 506 (as shown by point 521); at time $(t_1-1)$ candidate trajectory 520 specifies location 508 (as shown by point 522); and at time $(t_1)$ candidate trajectory 520 specifies location 510 (as shown by point 523). Likewise, at time $(t_1-2)$ candidate trajectory 540 specifies location 506 (as shown by point 541); at time $(t_1-1)$ candidate trajectory 540 specifies location 508 (as shown by point 542); and at time $(t_1)$ candidate trajectory 540 specifies location 512 (as shown by point 543).

It will be understood that each candidate trajectory, including, for example, candidate trajectories 520 and 540, can be represented as a function of time, with the output for each input time being the location specified by the candidate trajectory for such input time. As an example, candidate trajectory 520 can be represented by the function x(t). Thus, for example, $x(t_1)$ equals location 510.

In addition, as discussed above, in certain embodiments, the candidate trajectories can specify an orientation of the device at each pair of location and time. Thus, in such embodiments, many various candidate trajectories may specify the same sequence of locations but provide alternative candidate orientations for the device at each location.

Referring again to FIG. 3, at (308) a trajectory probability can be determined for each of the plurality of candidate trajectories identified at (306). The trajectory probability for each candidate trajectory can be determined according to any suitable method or algorithm. In particular, according to an aspect of the present disclosure, the trajectory probability for each candidate trajectory can be based at least in part on one or both of a location probability and a transition probability determined for each location specified by such candidate trajectory.

Figure 4:
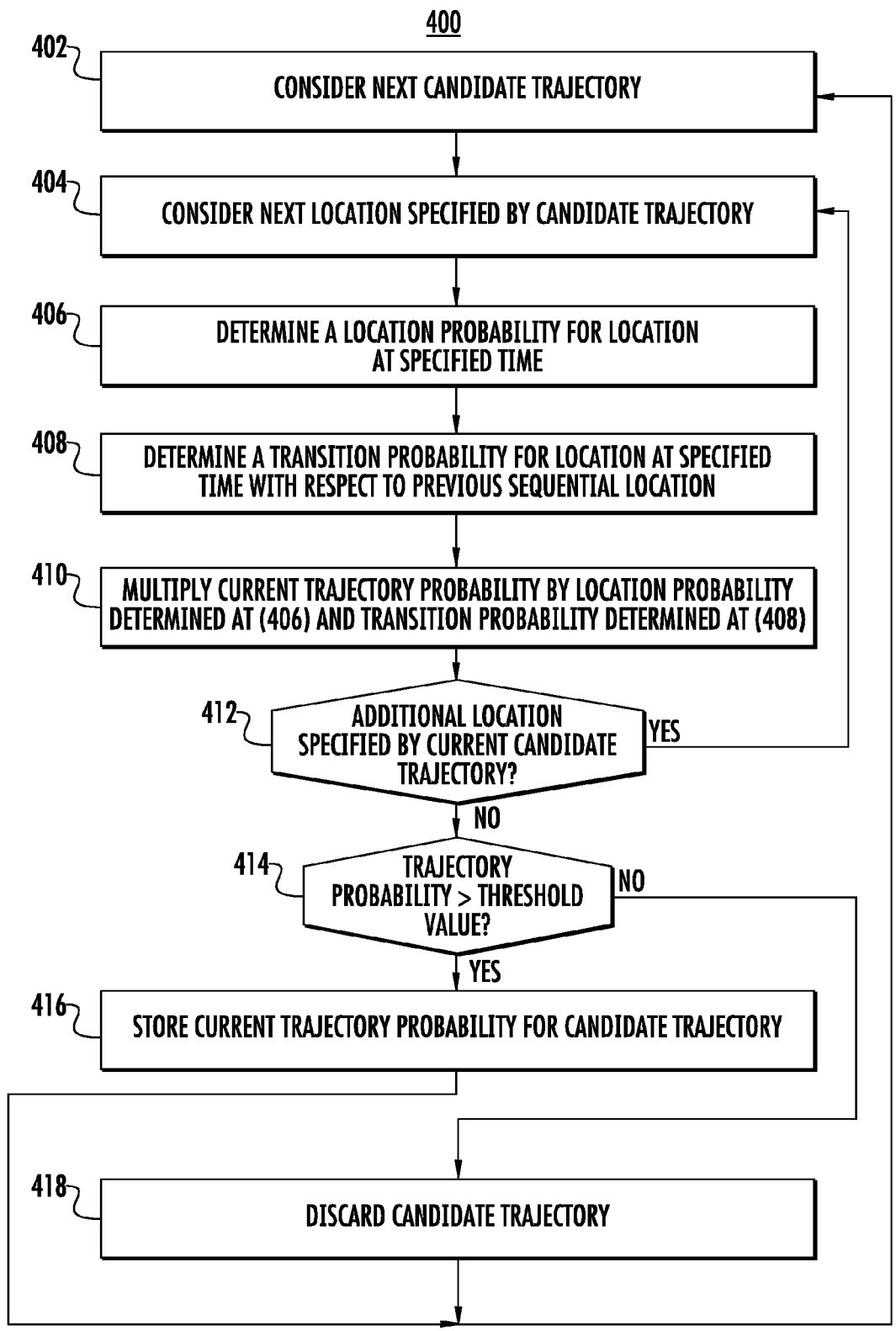
FIG. 4 depicts an example method for determining a plurality of trajectory probabilities according to an example embodiment of the present disclosure.

As an example, FIG. 4 depicts a flow chart of an example method (400) for determining a plurality of trajectory probabilities according to an example embodiment of the present disclosure. In particular, the trajectory of a device over space and time can be treated as a Hidden Markov Model and method (400) can be performed to identify the most probable trajectory (e.g. solve the Hidden Markov Model). Method (400) can be performed by any suitable computing system, including example system 100 of FIG. 1.

In addition, FIG. 4 depicts steps performed in a particular order for purposes of illustration and discussion. Those of ordinary skill in the art, using the disclosures provided herein, will understand that the various steps of method (400) can be omitted, adapted, and/or rearranged in various ways without departing from the scope of the present disclosure.

At (402) the next candidate trajectory can be considered or otherwise obtained. More particularly, method (400) can be implemented to provide a trajectory probability for each of a plurality of candidate trajectories. As such, the candidate trajectories can be ordered into a sequence according to any logic and considered sequentially on an individual basis. Thus, at the first instance of (402), a first candidate trajectory can be considered.

At (404) the next location specified by the presently considered candidate trajectory can be considered or otherwise obtained. More particularly, as discussed above, each candidate trajectory can specify a sequence of locations respectively corresponding to a plurality of times. Therefore, at the first instance of (404) the first location specified by the presently considered candidate trajectory can be considered.

At (406) a location probability can be determined for the presently considered location at the time specified for such location by the presently considered candidate trajectory. More particularly, one of a plurality of collected magnetic field readings can also be associated with the time specified for such location. A plurality of characteristics of the magnetic field reading can be determined at (406) or can have been previously determined.

Furthermore, at (406) a plurality of expected values associated with the presently considered location at the time specified for such location by the presently considered candidate trajectory can be obtained from a map of the magnetic field. For example, an expected value can be obtained for each of the plurality of characteristics determined for the corresponding magnetic field reading.

The location probability determined for the location at (406) can be a function of the difference between each of the plurality of characteristics and the corresponding expected value. For example, the function can be a weighted sum of the squared difference between each of the plurality of characteristics and its corresponding expected value. As another example, the function can be a multivariate Gaussian function.

It will be appreciated that the location probability can be expressed as a function of time and location. For example, the function $L(t, i)$ can provide a location probability for a particular input time $(t)$ and input location $(i)$ with respect to a given magnetic field reading collected at input time $(t)$. Further, in embodiments in which each candidate trajectory further specifies an orientation at each location, the location probability can be expressed as a function of time, location, and orientation $L(t,i,o)$.

At (408) a transition probability can be determined for the presently considered location with respect to the next sequential location specified by the presently considered candidate trajectory. For example, the transition probability for each location can provide the probability that the device relocated from such location to the next sequential location specified by the candidate trajectory based on whether such relocation is consistent with available data or other constraints.

As an example, in the instance that the device is also collecting data from one or more accelerometers or other positioning systems or sensors, then the transition probability for a pair of given locations can be a function of the degree to which relocation from the first location to the second location is consistent with the collected data from the one or more accelerometers or other positioning systems or sensors.

As another example, the transition probability for a pair of given locations can be a function of the degree to which relocation from the first location to the second location is consistent with knowledge concerning the layout or floorplan of a building in which the device is location. For example, if the pair of locations are on opposite sides of a known, existing wall without access, then the transition probability for such pair of locations can be penalized or zero.

As yet another example, the transition probability for a pair of given locations can be a function of the degree to which relocation from the first location to the second location is consistent with expected locational behavior associated with the device. For example, if it is known that the device is located within a building and relocation from the first location to the second location would require change in location at greater than a threshold speed, then the transition probability for such pair of locations can be penalized or zero. For example, the threshold speed can be a speed associated with walking or running.

In further implementations in which candidate orientations are included in the candidate trajectories, the transition probabilities can also depend upon the candidate orientations associated with a given pair of candidate locations.

It will be appreciated that the transition probability can be expressed as a function of time and a pair of locations. For example, the function $M(t, i, j)$ can provide a transition probability for a particular input time $(t)$, first input location $(i)$, and second input location $(j)$ with respect to sensor data or other constraints associated with input time $(t)$. Thus, $M(t, i, j)$ can provide the probability that the device relocated from location $(i)$ to location $(j)$ as the time changed from time $(t)$ to time $(t+1)$ in light of any available data or other constraints. Further, as noted above, other variables such as orientation may be included in such a transition probability function.

In addition, although the transition probability for each location is determined by method (400) with respect to the next sequential location, it will be understood that the transition probability for each location can be determined with respect to previous sequential location in a substantially similar fashion. Further, in some implementations, the transition probability for each location can consider both the previous location and the subsequent location.

At (410) the current trajectory probability for the presently considered candidate trajectory can be multiplied by the location probability determined at (406) and the transition probability determined at (408). Thus, the trajectory probability for a particular candidate trajectory can be updated as method (400) iteratively considers each location specified for a particular candidate trajectory. Further, as an example, at the first instance of (410) for each candidate trajectory, the trajectory probability can be initialized to be equal to 1.

It will be appreciated that the trajectory probability, as particularly determined by method (400), can be expressed as a function. For example, the trajectory probability for any particular candidate trajectory $x(t)$ can be equal to: $\Pi_t L(t, x(t)) \cdot M(t, x(t), x(t+1))$, wherein $\Pi_t$ designates taking the product over all time for which sufficient data is available.

At (412) it can be determined whether additional locations are specified by the current candidate trajectory. If it is determined that one or more additional locations are specified by the presently considered candidate trajectory and have not been considered, then method (400) can return to (404) and consider the next location specified by the presently considered candidate trajectory. In such fashion, each location and time specified by the current candidate trajectory can be considered individually and the trajectory probability can be updated to reflect each location and time.

However, if it is determined at (412) that all the locations specified by the current candidate trajectory have been considered, then method (400) can proceed to (414).

At (414) it can be determined whether the trajectory probability for the presently considered candidate trajectory is greater than a threshold value. If it is determined at (414) that the trajectory probability for the presently considered candidate trajectory is greater than the threshold value, then method (400) can proceed to (416).

At (416) the current trajectory probability for the current candidate trajectory can be stored in memory. After (416), method (400) can return to (402) and consider the next candidate trajectory.

However, if it is determined at (414) that the trajectory probability for the presently considered candidate trajectory is not greater than the threshold value, then method (400) can proceed to (418).

At (418) the candidate trajectory can be discarded. In such fashion, a large set of candidate trajectories can be reduced over time to only those candidate trajectories having not-insignificant trajectory probabilities.

After (418), method (400) can return to (402) and consider the next candidate trajectory. In such fashion, each candidate trajectory in a set of candidate trajectories can be considered individually. However, it will be understood that the iterative aspects of method (400) can be performed in parallel as well.

In addition, in some implementations, the trajectory probability for all candidate trajectories can be collectively updated as each of the plurality of times are iteratively considered. Further, in such implementations, candidate trajectories may be discarded if L(t, x(t))·M(t, x(t), x(t+1)) for a particular time (t) is less than a threshold value. In such fashion, candidate trajectories which include even one location that is unsupported by the data can be discarded.

Referring again to FIG. 3, after the trajectory probability is determined for each candidate trajectory at (308), then at (310) a location of the device can be determined based at least in part on the trajectory probabilities. As an example, the candidate trajectory receiving the largest trajectory probability can be selected as the trajectory of the device, such that the most recent location specified by the selected trajectory can be recognized as the location of the device.

As another example, a weighted average of the most recent location specified by each candidate trajectory can be determined and selected as the location of the device. The weighting for the location from each candidate trajectory can correspond to the trajectory probability associated with such candidate trajectory.

At (312) a map of the magnetic field can be updated based on one or more of the candidate trajectories. For example, after a significant volume of data has been collected by a device travelling about in the world, the device can report such data back to a central location for use in updating the map of the magnetic field. In such fashion, constraints such as entering and exiting a building, accurate GPS measurements, or other constraints can be relied upon to reconstruct and identify highly probable candidate trajectories accounting for the entirety of the volume of data, thereby providing improved candidate trajectories with which to update the map. For example, the map can be updated based on 10 to 1000 of the most probable candidate trajectories. As another example, the map can be updated based on each candidate trajectory with a trajectory probability greater than a threshold value. For example, the threshold value can be a factor F times the trajectory probability of the most probable candidate trajectory, where F is less than one.

According to an aspect of the present disclosure, updating the map at (312) can include performing a weighted average of determined characteristics of collected magnetic field readings with existing expected values at the locations specified by the candidate trajectories.

As an example, the weighting of the inputs for each average can take into account error values, numbers of previous updates, or confidence scores provided by the map and associated with particular expected values or locations when performing the averaging. As an example, update algorithm can limit the maximum possible change that a single device or single candidate trajectory can inflict upon the map.

As another example, the weighting of the inputs for each average can be based on one or more of the trajectory probabilities or location probabilities associated with particular candidate trajectories and collected magnetic field readings. For example, the weighting for each candidate trajectory can equal the trajectory probability for such candidate trajectory divided by the sum of the trajectory probabilities associated with all other candidate trajectories in the set.

According to another aspect of the present disclosure, map locations adjacent to, neighboring, or otherwise within a certain distance from locations specified by a candidate trajectory can also be updated based on such candidate trajectory and the collected magnetic field readings. In particular, updating neighboring locations in such fashion can help reduce a phenomenon known as "trench digging."

In "trench digging" a partially correct mapping becomes increasingly skewed over time as the correct values are consistently selected as the trajectory of the device and therefore receive the update. However, due to their incorrect nature, locations having incorrect map values are rarely selected and therefore are rarely updated to reflect current, correct values. Thus, spreading the influence of updates to additional parts of the map not specifically identified by a candidate trajectory can help to reduce such phenomenon.

As an example, expected values for the neighboring locations can be averaged with the determined characteristics of the collected magnetic field readings if they are sufficiently close in distance from the locations specified by the candidate trajectory. As another example, the determined characteristics of the collected magnetic field readings can be extrapolated to the neighboring locations and such extrapolated values can be averaged with the expected values for each neighboring location.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for determining location using magnetic field readings, the method comprising:
    obtaining, by one or more computing devices, a reading of a magnetic field collected by a magnetometer;
    determining, by the one or more computing devices, a plurality of characteristics of a magnetic field based at least in part on the reading, wherein determining one or more of the plurality of characteristics comprises isolating a component of the magnetic field that exhibits a frequency at which electrical power is transmitted along one or more power lines;
    communicating, by the one or more computing devices, with a server over a network to obtain a plurality of expected values associated with each of a plurality of locations, wherein the plurality of expected values for each location are provided by a map of the magnetic field stored by the server;
    comparing, by the one or more computing devices, the plurality of characteristics to the plurality of expected values associated with each of the plurality of locations;
    determining, by the one or more computing devices, a location probability for each of the plurality of locations based at least in part on the respective comparison of the plurality of characteristics to the plurality of expected values associated with such location; and
    determining, by the one or more computing devices, a device location based at least in part on the plurality of location probabilities respectively determined for the plurality of locations.

2. The method of claim 1, wherein:
    the reading of the magnetic field comprises a recording of data output by the magnetometer, wherein the data describes the magnetic field in three dimensions;
    the plurality of characteristics comprise an x-axis amplitude, a y-axis amplitude, a z-axis amplitude, an x-axis phase value, a y-axis phase value, and a z-axis phase value of the component of the magnetic field that exhibits the frequency at which electrical power is transmitted along the one or more power lines; and
    determining, by the one or more computing devices, the plurality of characteristics of the magnetic field based at least in part on the reading comprises:
        fitting, by the one or more computing devices, a model waveform to each dimension of the recording to obtain a fitted recording, wherein the model waveform comprises a sine wave of the frequency at which electrical power is transmitted along the one or more power lines; and
        determining, by the one or more computing devices, the plurality of characteristics of the magnetic field based at least in part on the fitted recordings.

3. The method of claim 1, wherein:
    the reading of the magnetic field comprises a recording of data output by the magnetometer, wherein the data describes the magnetic field in three dimensions;
    the plurality of characteristics comprise an x-axis amplitude, a y-axis amplitude, a z-axis amplitude, an x-axis phase value, a y-axis phase value, and a z-axis phase value of the component of the magnetic field that exhibits the frequency at which electrical power is transmitted along the one or more power lines; and
    determining, by the one or more computing devices, the plurality of characteristics of the magnetic field based at least in part on the reading comprises:
        applying, by the one or more computing devices, a digital filter to the recording to isolate the component of the magnetic field that exhibits the frequency at which electrical power is transmitted along the one or more power lines; and
        determining, by the one or more computing devices, the plurality of characteristics of the magnetic field based at least in part on the filtered recording.

4. The method of claim 1, wherein determining, by the one or more computing devices, the plurality of characteristics of the magnetic field based at least in part on the reading comprises:
    determining, by the one or more computing devices, an orientation of the magnetometer;
    rotating, by the one or more computing devices, the reading of the magnetic field from a device coordinate frame to a global coordinate frame based at least in part on the orientation; and
    determining, by the one or more computing devices, the plurality of characteristics of the magnetic field based at least in part on the rotated reading.

5. The method of claim 1, wherein:
    the plurality of characteristics of the magnetic field comprise the dot product of an in-phase vector with a DC vector, the dot product of an out-of-phase vector with the DC vector; and the dot product of the in-phase vector with the out-of-phase vector;
    the DC vector describes a component of the magnetic field that exhibits a frequency at about zero;
    the in-phase vector comprises the cosine of a phase angle value times an AC vector describing the component of the magnetic field that exhibits a frequency at which electrical power is transmitted along one or more power lines; and
    the out-of-phase vector comprises the sine of the phase angle value times the AC vector.

6. The method of claim 1, wherein:
    the plurality of characteristics of the magnetic field comprise a vertical portion of each of a DC vector, an in-phase vector, and an out-of-phase vector, the dot product of a horizontal plane portion of the in-phase vector with a horizontal plane portion of the DC vector, the dot product of a horizontal plane portion of the out-of-phase vector with the horizontal plane portion of the DC vector, and the dot product of the horizontal plane portion of the in-phase vector with the horizontal plane portion of the out-of-phase vector;
    the DC vector describes a component of the magnetic field that exhibits a frequency at about zero;
    the in-phase vector comprises a time average of the cosine of a phase angle value times an AC vector describing the component of the magnetic field that exhibits a frequency at which electrical power is transmitted along one or more power lines; and
    the out-of-phase vector comprises a time average of the sine of the phase angle value times the AC vector.

7. The method of claim 1, wherein determining, by the one or more computing devices, the device location comprises determining, by the one or more computing devices, the device location in three-dimensional space.

8. The method of claim 1, further comprising:
    uploading, by the one or more computing devices to the server, one or more of the plurality of location probabilities associated with the plurality of locations and one or more of the plurality of characteristics for use in updating the map.

9. One or more non-transitory computer-readable media storing instructions that, when executed by one or more computing devices, cause the one or more computing devices to perform operations, the operations comprising:
   obtaining a plurality of readings of a magnetic field respectively associated with a plurality of times;
   determining, for each of the plurality of readings, a plurality of characteristics of a component of the magnetic field that oscillates at a frequency associated with one or more alternating current power conductors, wherein determining, for each of the plurality of readings, the plurality of characteristics comprises isolating the component of the magnetic field that oscillates at the frequency associated with the one or more alternating current power conductors;
   communicating with a server over a network to obtain a plurality of expected values associated with each of a plurality of locations, wherein the plurality of expected values for each location are provided by a map of the magnetic field stored by the server;
   comparing, for each of the plurality of readings, the plurality of characteristics for such reading to the plurality of expected values associated with the plurality of locations;
   respectively determining, for each of the plurality of times, a plurality of location probabilities respectively for the plurality of locations based at least in part on the comparison of the plurality of characteristics for the reading associated with such time to the plurality of expected values associated with the plurality of locations; and
   determining a trajectory based at least in part on the plurality of location probabilities associated with each of the plurality of times, wherein the trajectory provides a series of device locations.

10. The one or more non-transitory computer-readable media of claim 9, wherein determining, for each of the plurality of readings, the plurality of characteristics of the component of the magnetic field that oscillates at the frequency associated with one or more alternating current power conductors comprises determining, for each of the plurality of readings, an x-axis amplitude, a y-axis amplitude, a z-axis amplitude, an x-axis phase value, a y-axis phase value, and a z-axis phase value of the component of the magnetic field that oscillates at the frequency associated with one or more alternating current power conductors.

11. The one or more non-transitory computer-readable media of claim 9, wherein determining a trajectory based at least in part on the plurality of location probabilities associated with each of the plurality of times comprises determining a trajectory probability for each of a plurality of candidate trajectories based at least in part on the plurality of location probabilities associated with each of the plurality of times, wherein each of the plurality of candidate trajectories specifies one of the plurality of locations for each of the plurality of times, and wherein the trajectory probability for each of the plurality of candidate trajectories is based at least in part on the respective location probabilities associated with each of the plurality of locations specified by the candidate trajectory at the time specified by the candidate trajectory.

12. A system for determining locations using magnetic field readings, the system comprising:
   one or more computing devices; and
   one or more non-transitory computer-readable media storing instructions that, when executed by the one or more computing devices, cause the one or more computing devices to perform operations, the operations comprising:
      obtaining a plurality of magnetic field readings respectively associated with a plurality of times;
      determining, for each of the plurality of magnetic field readings, a plurality of characteristics of a component of the magnetic field that oscillates at a frequency associated with one or more alternating current power conductors, wherein determining, for each of the plurality of magnetic field readings, the plurality of characteristics comprises isolating the component of the magnetic field that oscillates at the frequency associated with the one or more alternating current power conductors;
      communicating with a server over a network to obtain a plurality of expected values associated with each of a plurality of locations, wherein the plurality of expected values for each location are provided by a map of the magnetic field stored by the server;
      comparing, for each of the plurality of magnetic field readings, the plurality of characteristics for such reading to the plurality of expected values associated with the plurality of locations;
      determining a location probability for each of the plurality of locations for each of the plurality of times based at least in part on the comparison of the plurality of characteristics for the reading associated with such time to the plurality of expected values associated with the plurality of locations, wherein the location probability for each location for each time indicates the probability that the magnetic field reading collected at such time was collected at such location; and
      determining a trajectory probability for each of a plurality of trajectories based at least in part on the location probabilities determined for each of the plurality of locations for each of the plurality of times, wherein each of the plurality of trajectories comprises a sequence of selected of the locations over the plurality of times; and
      determining a device location based at least in part on the trajectory probabilities determined for the plurality of trajectories.

13. The system of claim 12, wherein each of the plurality of magnetic field readings comprises an x-axis amplitude, a y-axis amplitude, a z-axis amplitude, an x-axis phase value, a y-axis phase value, and a z-axis phase value of the component of the magnetic field that oscillates at a frequency associated with one or more power lines, and wherein each of the plurality of expected readings comprises an expected x-axis amplitude, an expected y-axis amplitude, an expected z-axis amplitude, an expected x-axis phase value, an expected y-axis phase value, and an expected z-axis phase value of the component of the magnetic field that oscillates at the frequency associated with the one or more power lines.

14. The system of claim 12, wherein the one or more non-transitory computer-readable media store further instructions that, when executed by the one or more computing device, cause the one or more computing devices to perform operations, the operations comprising:
   determining, for each of the plurality of times based at least in part on the magnetic field reading associated with such time, an AC vector describing a component of the magnetic field that oscillates at a frequency associated with one or more power lines;

multiplying the AC vector associated with each time by the cosine of an expected phase angle value associated with such time to obtain an in-phase vector; and multiplying the AC vector associated with each time by the sine of an expected phase angle value associated with such time to obtain an out-of-phase vector;

wherein determining the location probability for each of the plurality of locations for each of the plurality of times comprises determining the location probability for each of the plurality of locations for each of the plurality of times based at least in part on the in-phase vector associated with such time and the out-of-phase vector associated with such time.

15. The system of claim 14, wherein the one or more constraints comprise one or more of data generated by one or more accelerometers and a threshold speed limitation.

16. The system of claim 12, wherein:
the trajectory probability for each of the plurality of trajectories is determined based at least in part on the product of the location probability for each location included in the sequence of locations associated with such trajectory at the time specified by such sequence respectively multiplied by a transition probability for each location in the sequence of locations; and
the transition probability for each location in each sequence of locations provides a probability that a device has relocated from such location to the next location in such sequence of locations based at least in part on one or more constraints.

17. The system of claim 12, wherein each of the plurality of trajectories further comprises a plurality of orientations respectively associated with the sequence of the locations associated with such trajectory.

18. The system of claim 12, wherein:
the one or more non-transitory computer-readable media store further instructions that, when executed by the one or more computing devices, cause the one or more computing devices to perform further operations, the further operations comprising updating the map based at least in part on one or more of the plurality of trajectory probabilities associated with the plurality of trajectories.

19. The system of claim 18, wherein updating the map based at least in part on one or more of the plurality of trajectory probabilities associated with the plurality of trajectories comprises respectively averaging, for one or more of the plurality of trajectories, the plurality of magnetic field readings with the plurality of expected readings associated with the sequence of locations associated with such trajectory.

20. The system of claim 18, wherein updating the map based at least in part on one or more of the plurality of trajectory probabilities associated with the plurality of trajectories comprises, for one or more of the plurality of trajectories, updating the expected values respectively associated with a plurality of neighboring locations of each location specified by the one or more of the plurality of trajectories based at least in part on the magnetic field reading associated with such location by the one or more of the plurality of trajectories.

* * * * *